A. ADAMETZ.
Processes for Preserving Beer.

No. 142,428.  Patented September 2, 1873.

UNITED STATES PATENT OFFICE.

ANTON ADAMETZ, OF NEW YORK, N. Y.

IMPROVEMENT IN PROCESSES FOR PRESERVING BEER.

Specification forming part of Letters Patent No. 142,428, dated September 2, 1873; application filed August 15, 1873.

*To all whom it may concern:*

Be it known that I, ANTON ADAMETZ, of the city, county, and State of New York, have invented a new and Improved Process for Preparing the Atmosphere in Vessels containing Beer or other Beverages; and I do hereby declare the following to be a full, clear, and exact description thereof, which will enable those skilled in the art to make and use the same, reference being had to the accompanying drawing forming part of this specification.

This invention consists in a novel mode or process for purifying the atmosphere prior to its entrance into a beer-barrel or other vessel by causing the atmosphere to traverse or pass through lime-juice, by means of an apparatus hereinafter described, in such a manner that when the pressure in the barrel sinks below the pressure of the external atmosphere a quantity of air will be sucked in through the lime-juice, which lime-juice has a cooling and purifying effect on the atmosphere, and prevents the beer or other beverage from getting stale, and the lime-juice, possessing many medicinal and flavoring properties, is especially adapted for the above-named purpose.

In carrying out my invention, I employ an apparatus such as illustrated—

Figure 1:
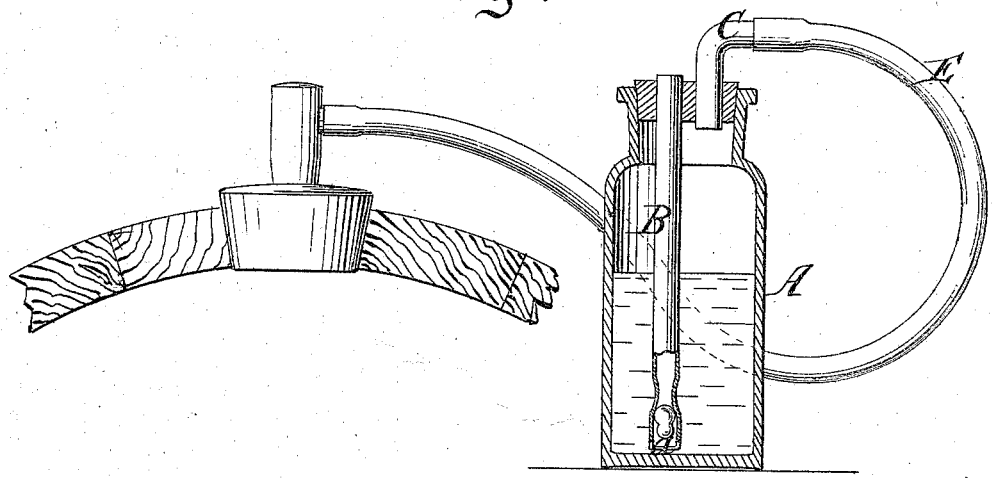
Figure 2:
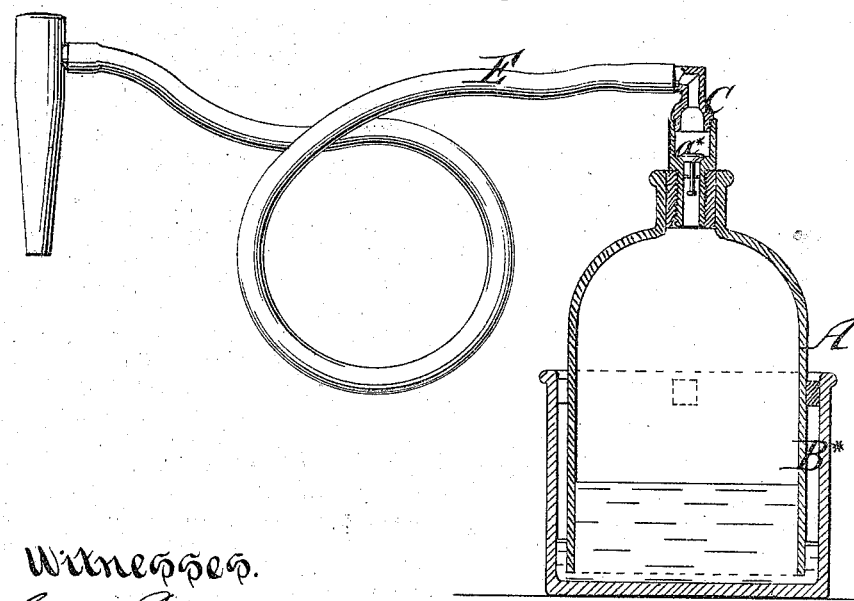

Figure 1 being a sectional side view of one form, while Fig. 2 is a similar view of a modification.

I will now describe the apparatus and its mode of operation.

In the drawing, the letter A designates a vessel, which is partially filled with juice of the West India lime, or with some other liquid suitable for the purpose to be accomplished. This vessel is firmly closed, and through its top or stopper extends a pipe, B, nearly down to the bottom of the vessel. In said stopper is also secured a pipe, C, which connects, by a flexible pipe, E, with a barrel or other vessel containing beer or another beverage of a similar nature. In the pipe B is a check-valve, $a$, to prevent the liquid in the vessel A from being forced out by the pressure of the gases in the barrel or other vessel. When the beer or other beverage is drawn from the barrel the pressure of said gases is reduced, and the beer ceases to flow, unless a vent is provided to allow the external air to enter; but if the atmosphere in the barrel consists of ordinary air, the beer or other liquid soon becomes stale. This disadvantage is obviated by my apparatus. If the pressure in the barrel is reduced below the atmospheric pressure, the external air is sucked in through the pipes B and E, and in its passage from the pipe B to the pipe E said air has to pass through the liquid contained in the vessel A, and it becomes saturated with the vapors of said liquid, so that when it enters the barrel an atmosphere is formed which is not detrimental to the beer or other liquid contained in said barrel.

Instead of drawing the air in through a pipe, B, as shown in Fig. 1, I can construct my vessel A in two parts, as shown in Fig. 2, the inner part being open at the bottom and the outer part open at the top. Between these two parts an annular air-space, $B^*$, is formed, so that when the pressure in the barrel is reduced the external air will pass through this air-space, and through the liquid in the vessel A to the pipe E, and through this pipe into the barrel. In this case the check-valve $a^*$ is placed in the pipe C, so as to prevent the pressure of the gases in the barrel from forcing the liquid contained in the vessel A out through the annular air-space $B^*$.

In either case the air passing into the barrel is saturated with the vapors of the liquid in the vessel A, and the beer or other beverage contained in said barrel is prevented from getting stale; and as the lime-juice contains much acidity, its use in this connection will be found highly beneficial to health, and valuable for the purpose stated.

I am aware that alcohol and other liquids have been used for purifying the atmosphere before its entrance into beer-barrels, and as a preservative; but such I do not claim, as the vapor arising and carried over from such liquids, should condensation occur, would add an increased per cent. of alcohol to the beer, which is not my intent, nor is it desirable.

I claim as my invention—

The process herein described for purifying the atmosphere before its entrance into a beer-barrel or other vessel, by causing the same to pass through lime-juice, in the manner substantially as herein shown and described.

This specification signed by me this 11th day of August, 1873.

A. ADAMETZ.

Witnesses:
W. HAUFF,
E. F. KASTENHUBER.